United States Patent [19]
Takeda et al.

[11] Patent Number: 5,529,337
[45] Date of Patent: Jun. 25, 1996

[54] AIR BAG DEVICE

[75] Inventors: Hideo Takeda, Tokyo; Nobuya Osada; Hiroaki Fujii, both of Shiga-ken; Takahiro Yamanishi, Hikone, all of Japan

[73] Assignee: Takata Corporation, Tokyo, Japan

[21] Appl. No.: 301,628

[22] Filed: Sep. 7, 1994

[30] Foreign Application Priority Data

Dec. 8, 1993 [JP] Japan .................................. 5-340793

[51] Int. Cl.$^6$ .................................................. B60R 21/24
[52] U.S. Cl. ........................................ 280/729; 280/731
[58] Field of Search ...................................... 280/729, 731

[56] References Cited

U.S. PATENT DOCUMENTS 3,476,402 11/1969 Wilfert ....................................... 280/729
3,752,501 8/1973 Daniel et al. ............................. 280/729

FOREIGN PATENT DOCUMENTS 2114201 6/1972 France .
2248393 4/1973 Germany .
3833888 4/1990 Germany ................................. 280/729
4305050 9/1993 Germany ................................. 280/729
132444 5/1989 Japan ....................................... 280/729

OTHER PUBLICATIONS

Patent Abstracts Of Japan, vol. 13, No. 380 (M–863), Aug. 23, 1989 Nippon Plast Co., Ltd., Pat: A 1132444, Pat. Date: May 24, 1989.

*Primary Examiner*—Kenneth R. Rice
*Attorney, Agent, or Firm*—Kanesaka & Takeuchi

[57] ABSTRACT

An air bag device is formed of a first air bag accommodated in a steering pad and receiving an occupant by the inflation and deployment at a collision and a second air bag seamed with a portion of the first air bag and being inflatable in a ring shape to cover a surface of a steering wheel facing to the occupant. The first air bag and the second air bag have gas communicating holes at a seaming portion between them. The first air bag is inflated by introducing gas a gas generating device connected to a gas inlet of said first air bag and the second air bag is inflated at the same time by introducing gas through the gas communicating holes.

9 Claims, 6 Drawing Sheets

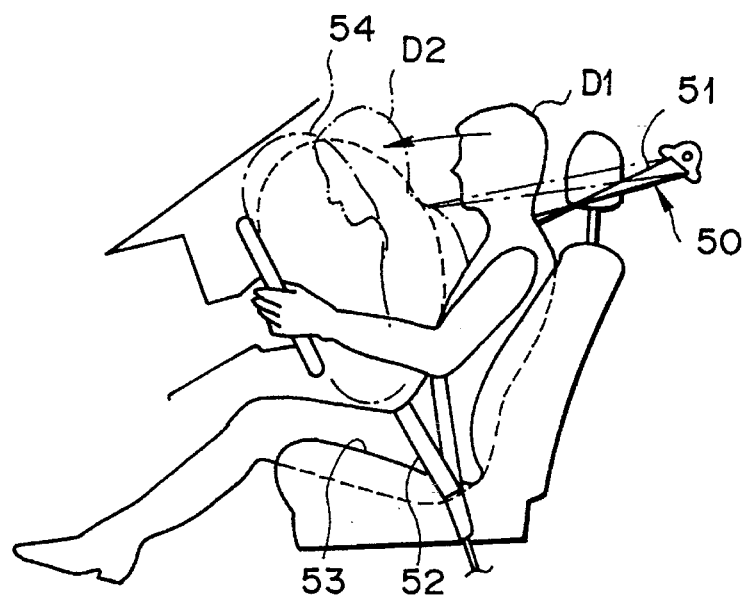
PRIOR ART FIG. 1
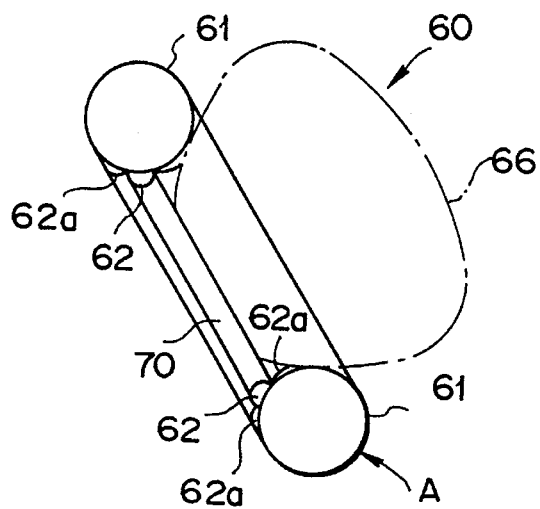
PRIOR ART FIG.2(a)
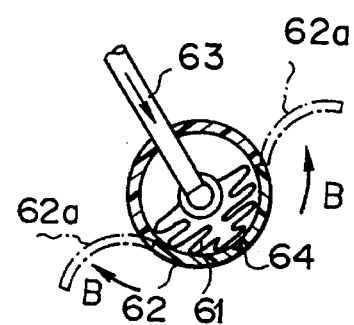
PRIOR ART FIG.2 (b)

AIR BAG DEVICE

BACKGROUND OF THE INVENTION

The present invention relates to an air bag device, more particularly, to an air bag device which can prevent an occupant from bumping against a steering wheel, absorb an impact force applied to the occupant's head and chest and reliably protect the occupant.

Recently, an air bag device is adopted to various kinds of vehicles as a passive occupant protection system for efficiently protecting an occupant from the action of the impact force at a collision.

The purpose of the air bag device is to prevent the occupant from a secondary collision in a cabin by receiving the occupant's body, particularly, the head and chest with a bag shaped cushion filled with gas during a collision.

As shown in FIG. 1, when a position D1 of an occupant in a driver's seat moves to the position D2 at a collision, the occupant is protected by the deployed air bag 54 at his chest and head. Thereby, the occupant is protected from the secondary collision, that is, the occupant plunges into and bumps against a steering wheel or a windshield of the vehicle.

As shown in FIG. 2 (a), an air bag device is proposed wherein the air bag device has a conventional air bag (hereinafter, the air bag shown by long and short dash lines is called by "main bag") and an air bag formed in a ring shape to cover a periphery of the steering wheel (hereinafter, the air bag formed in a ring shape and disposed at a periphery of the main bag is called by "sub bag") and the both air bags are deployed (See Journal of Technical Disclosure published by Japan Institute of Invention and Innovation, Technical Disclosure No. 88-15251, Published Unexamined Utility model No. 1989-122349).

In the air bag device disclosed in the Journal of Technical Disclosure No. 88-15251, as shown in FIG. 2(a) and FIG. 2(b), the sub bag 61 is folded and accommodated in a hollow rim 62 of the steering wheel 70 and gas for inflation and deployment is introduced into the sub bag 61 through a spoke 63 acting also as a gas pipe as shown by the arrow. The hollow rim 62 has a tear line 64 formed at a predetermined position thereof. As the gas is introduced into the sub bag 61 to apply an inner pressure, the tear line 64 breaks and portions 62a of the hollow rim 62 is expanded in a direction of the arrow B, then the sub bag 61 accommodated inside the hollow rim 62 expands like a rush. At the same time, the main bag 66 expands and deploys so as to prevent the occupant moving in a direction of the arrow A from bumping against the steering wheel 70 and to protect the occupant's head and chest from an impact.

However, a considerable capacity in the hollow rim 62 is necessary for folding and accommodating the sub bag 61 in the hollow rim of the steering wheel 70. The diameter of the rim 62 becomes wide, so that the grip size becomes big and an operational feeling for steering becomes inferior.

Because the rim 62 is a portion which the driver always holds to steer, the rim 62 should have rigidity and strength not to break even if the rim is griped hard. On the other hand, the tear line formed on the periphery of the rim 62 should be formed as a weak part to easily break when the internal pressure is applied by introducing gas. Actually, it is quite difficult to make such a rim 62 structured to be compatible as mentioned above.

Furthermore, even if the rim is designed to overcome the above conditions, it takes time to fold and accommodate the sub bag 61 in the rim 62 and to mount the gas pipe and the like. Therefore, the whole air bag device becomes quite expensive.

It is an object of the present invention to solve the problems of the prior art as mentioned above and to provide an air bag device having a sub bag with reasonable cost and simple structure.

SUMMARY OF THE INVENTION

For achieving the above mentioned object, a first invention provides an air bag device comprising a first air bag accommodated in a steering pad and receiving an occupant by the inflation and deployment during a collision, and a second air bag seamed with a portion of the first air bag and being inflatable in a ring shape to cover a surface of a steering wheel facing to the occupant, the first air bag and the second air bag having gas communicating holes at a seaming portion between them, the first air bag being inflated by introducing gas from gas generating means connected to a gas inlet of the first air bag and the second air bag being inflated at the same time by introducing gas through the gas communicating holes.

A second invention provides an air bag device comprising a first air bag accommodated in a steering pad and receiving an occupant by the inflation and deployment during a collision, and a second air bag seamed with a portion of the first air bag and being inflatable in a ring shape to cover a surface of a steering wheel facing to the occupant, the first air bag and the second air bag having gas communicating holes at a seaming portion between them, the second air bag being inflated by introducing gas from gas generating means connected to a gas inlet of the second air bag and the first air bag being inflated at the same time by introducing gas through the gas communicating holes.

Furthermore, the invention provides an air bag device comprising a first air bag accommodated in a steering pad and receiving an occupant by the inflation and deployment during a collision, and a second air bag seamed with a portion of the first air bag, accommodated in the first air bag and being inflatable in a ring shape to cover a surface of a steering wheel facing to the occupant, the second air bag having gas communicating holes to communicate gas with the first air bag, the second air bag being inflated by introducing gas from gas generating means connected to a gas inlet of the second air bag and the first air bag being inflated at the same time by introducing gas through the gas communicating holes.

A third invention provides an air bag device comprising a first air bag accommodated in a steering pad and receiving an occupant by the inflation and deployment during a collision, a second air bag seamed with a portion of the first air bag and being inflatable in a ring shape to cover a surface of a steering wheel facing to the occupant, and gas generating means connected to a gas inlet of the first air bag and to a gas inlet of the second air bag separately and being able to introduce gas to the both gas inlets respectively, the first air bag and the second air bag being inflated by introducing gas through the separate gas paths from the gas generating means at the same time.

According to each of the above mentioned inventions, an air bag device comprises a first air bag accommodated in a steering pad and receiving an occupant by the inflation and deployment during a collision, and a second air bag seamed with a portion of the first air bag and being inflatable in a ring shape to cover a surface of a steering wheel facing to the occupant, the first air bag and the second air bag having gas communicating holes at a seaming portion between them, the first air bag being inflated by introducing gas from gas generating means connected to a gas inlet of the first air bag and the second air bag being inflated at the same time by introducing gas through the gas communicating holes so that the air bag device can prevent the occupant form bumping against the steering wheel by the second air bag and can protect the occupant's head and chest by the first air bag.

BRIEF DESCRIPTION OF THE DRAWINGS

FIG. 1 is an explanatory view showing an operational condition of an air bag device during a collision;

FIG. 2 (a) is an explanatory view showing an example of deployment condition of an air bag device having a bag portion for covering a conventional steering wheel;

FIG. 2 (b) is detailed sectional view of the steering wheel as shown in FIG. 2 (a);

DETAILED DESCRIPTION OF THE PREFERRED EMBODIMENTS

The description will now be made with reference to the drawings.

Figure 3:
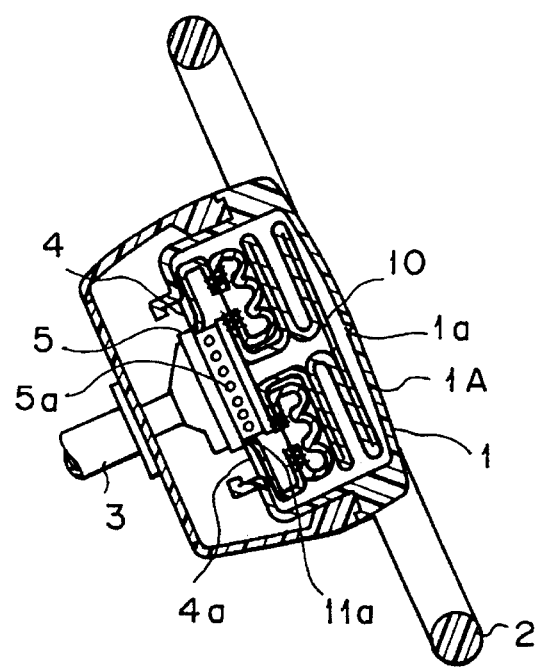
FIG. 3 is a sectional view showing an embodiment of an air bag device according to a first invention.

FIG. 3 is a sectional view showing an example of the accommodating condition of components of an air bag device according to a first embodiment of the first invention which is accommodated within a steering center pad 1.

The steering center pad 1 is fixed to an end of a steering column 3 and integrally structured with a steering wheel 2 through spokes (not shown) at a substantially central portion of the steering wheel 2. The steering center pad 1 rotates with the steering wheel 2 around the steering column 3 during steering.

A retainer plate 4 is fixed in the steering center pad 1 by a fixing screw (not shown). The retainer plate 4 is for fixedly supporting an inflator 5 as a gas source of the air bag device in the center pad 1.

The inflator 5 is an equivalent with one of a conventional air bag device. The inflator 5 has a gas outlet 5a formed in a side surface of a rough cylindrical shaped body to spout reaction gas from the gas outlet 5a to inflate and deploy a folded air bag 10 (described in detail) in a predetermined shape.

The description will be made as regard to the air bag 10 of the air bag device according to the present invention referring to FIG. 3 and FIG. 4.

The air bag 10 according to the present invention comprises a main bag 11 as a first air bag having a volume of approximately 60 liters and a sub bag 12 as a second air bag fixed to a portion of the peripheral of the main bag 11 and deploying in a ring shape at a position to cover the steering wheel 2 (hereinafter, the main bag and the sub bag are generically called the air bag 10).

A nylon fabric of which an inner surface is coated by a silicone is employed as cloths for the main bag 11 and the sub bag 12. The nylon woven fabric is a fabric woven with fine threads of approximately 420 deniers so that the folded size of the air bag 10 is smaller.

Figure 4:
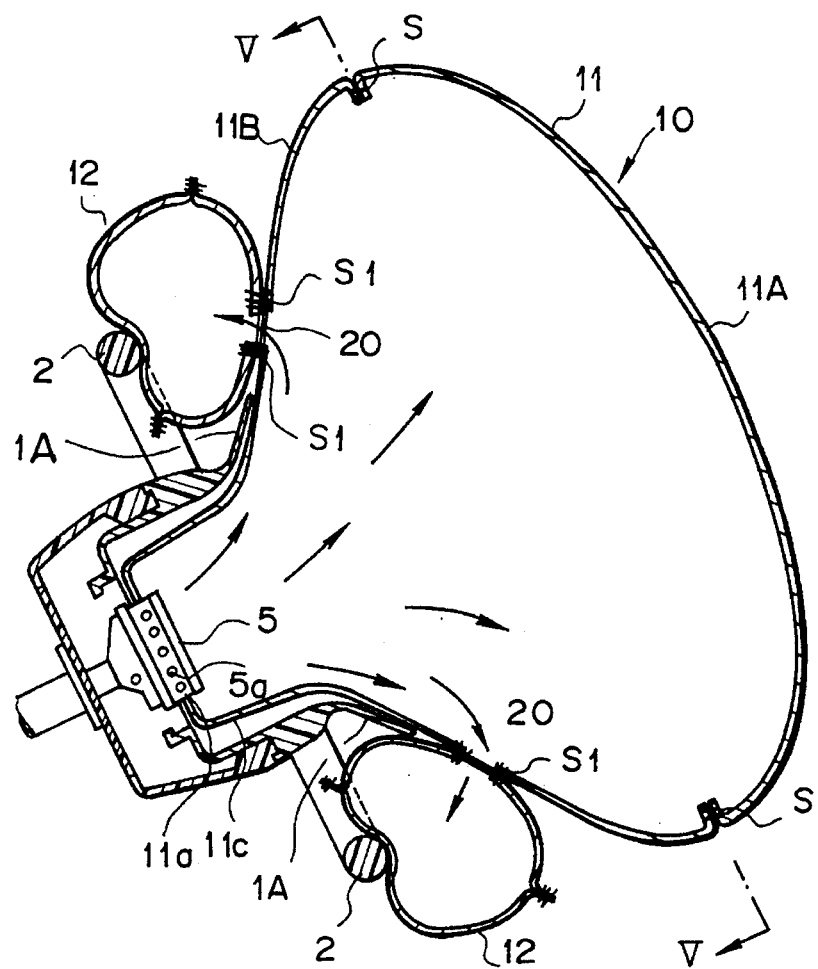
FIG. 4 is a sectional view showing an example of deployment condition of the air bag device as shown in FIG. 3.

FIG. 4 shows a condition of the inflation and deployment of the air bag 10. In this embodiment, the main bag 11 comprises a front panel 11A as a pressure cell part expanding in a flat semi-spherical shape for receiving the occupant and a base panel 11B cut in a rough cone-trapezoid shape. The base panel 11B has a root portion 11c and gas inlet 11a provided in the root portion 11c. The end of the front panel 11A is seamed with the end of the base panel 11B at a tacking portion S to make the main bag 11 in a bag shape.

The sub bag 12 is seamed along the periphery of the base panel 11B. The sub bag 12 deploys in the ring shape by introducing gas inside thereof. At the same time, the deployed sub bag 12 is positioned between the deployed main bag and the steering wheel 2 and covers a portion of the steering wheel 2 facing the occupant.

Thereby, even if the occupant is given an impact and moves toward the steering wheel 2, the occupant is received by the sub bag 12 and protected his or her head and chest by the main bag 11 at the same time.

In this embodiment, the main bag 11 and the sub bag 12 are inflated simultaneously with the reaction gas generated from the single inflator 5. Gas communicating holes 20 are provided in the connecting portion between the main bag 11 and the sub bag 12 as shown in FIG. 4. Thereby, the reaction gas spouted from the inflator 5 inflates the main bag 11 and is supplied to the sub bag 12 through the gas communicating holes 20 so that the main bag 11 and the sub bag 12 are inflated simultaneously. The volume of the sub bag 12 is pretty smaller than that of the main bag 11. Each diameter of the gas communicating holes 20 of the sub bag 12 and main bag 11 is set in a suitable size to properly set the inflation timing of the both bags.

By setting the inflation timing, the sub bag 12 inflated in the ring shape is prevented from being out of position between the steering wheel 2 and the main bag 11, and the main bag 11 the inflation and deployment thereof.

Figure 5:
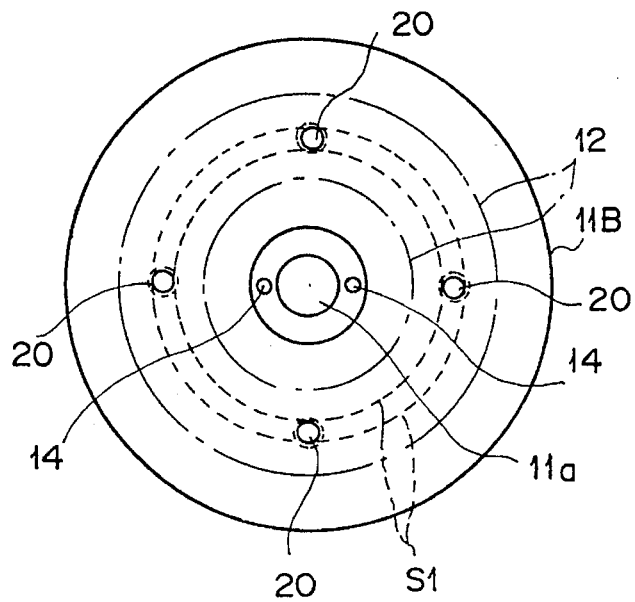
FIG. 5 is a plan sectional view showing an arrangement of gas communicating holes and vent holes which are formed in the air bag device, taken along line V—V in FIG. 4.

FIG. 5 is a sectional view of the main bag 11 for explaining an arrangement of the gas communication holes 20 provided between the main bag 11 and the sub bag 12. As shown in this figure, the sub bag 12 (the deployment condition is shown by long and short dash lines) is seamed with the base panel 11B of the main bag 11 at a two-seams S1 portion concentrically disposed. Four circle holes are made between the two seams, that is, the four gas communicating holes 20 spaced at the same intervals therein.

Though the number of the gas communicating holes 20 provided around the gas inlet 11a of the main bag 11 is four in this embodiment, the diameter and the number of the gas communicating holes may be freely chosen. At this stage, the number of the gas communicating holes 20 is preferably from two to four to inflate the sub bag at a uniform pace.

In this embodiment, two vent holes 14 are provided near the gas inlet 11a of the main bag 11. The vent holes 14 exhaust gas in the main bag 11 gradually when the occupant strongly bumps into the inflated main bag 11. Thereby, the main bag 11 has a long buffer stroke so as to absorb an impact applied to the occupant's face or the like when the occupant bumps into the main bag 11.

In this manner, the gas in the main bag is exhausted through the vent holes 14 while the occupant bumps into the air bag so that the main bag 11 can absorb the impact and protect the occupant. In other words, if the main bag 11 has no gas outlet hole such as the vent holes 14, the occupant tends to strongly rebound off the main bag 11 when the occupant collides with the main bag 11. Such a phenomenon is called a rebound phenomenon. If the rebound phenomenon of the air bag is severe, the air bag cannot function as an impact absorbing device.

On the other hand, it is an object of the sub bag 12 to prevent the occupant from directly bumping against the steering wheel 2. Therefore, the sub bag 12 may not be provided with a measure for easing the rebound phenomenon. Because the sub bag normally has no vent hole, the sub bag maintains the inflation condition in a rough ring shape with high internal pressure. The sub bag is maintained in this shape and is positioned around the main bag decreasing its inner volume by exhausting the gas, so that the main bag can decrease its inner volume with keeping its shape roughly.

The description will be made as regard to the structure of the steering center pad in which the air bag is accommodated referring to FIG. 3 and FIG. 4.

In this embodiment, the steering center pad 1 has a lid. The lid may be a resin molding product produced by molding urethane resin on a surface of an aluminum plate as a core of the resin molding product. Though a tear line is provided at a substantial central portion of the lid 1A of the pad 1 facing the occupant, the lid 1A is maintained its stiffness not to break by a normal horn operation and a light contact.

On the other hand, as the reaction gas is introduced into the main bag 11 at a collision, the main bag 11 is inflated slightly to push the lid 1A from the inside thereof. When the internal pressure is over the predetermined threshold, the tear line provided in the inner surface of the lid 1A breaks so that the air bag 10 folded inside rushes out. At this stage, the lid 1A of which the tear line broke bends to be outwardly opened by the base portion 11B of the main bag 11 (See FIG. 4).

An embodiment according to the second invention will be described referring to FIG. 6 and FIG. 8.

The steering center pad 1 for the second invention has the same one of the inflator 5 as shown in FIG. 4. A sub bag 25 has a gas inlet 25a to communicate the gas between the sub bag 25 and the main bag 11. FIG. 6 is a whole sectional view of this embodiment.

The sub bag 25 is different from the sub bag 12 of the embodiment according to the first invention. A base portion 25B of the sub bag 25 is accommodated in the steering center pad 1. The gas inlet 25a provided in the base portion 25B connects with the inflator 5 at the lower side of the pad and maintains the airtightness.

Figure 8:
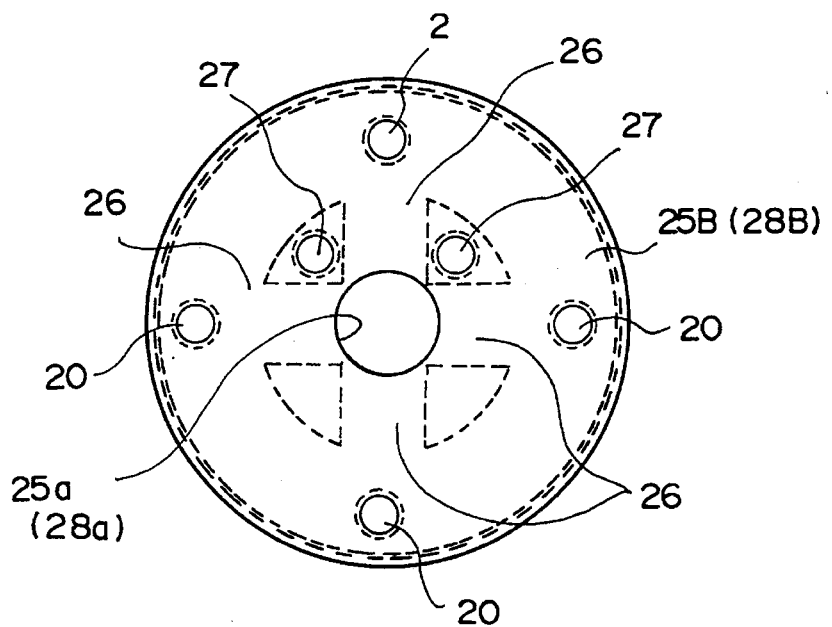
FIG. 8 is a plan sectional view showing an arrangement of gas communicating holes and vent holes which are formed in the air bag device, taken along line VIII—VIII in FIG. 6.

Furthermore, a sub bag gas path 26 formed in a rough cross shape is provided by seaming with the main bag 11 as shown in FIG. 8. The sub bag 25 is supplied with gas from the inflator 5 through the sub bag gas path 26.

On the other hand, a peripheral edge of the base panel 25B is seamed with a ring panel 25A made of a ring shaped cloth. Four pores as shown in FIG. 8 are provided in the ring panel 25A. The pores are gas communicating holes 20 to the main bag 11 to introduce the gas supplied in the sub bag 25 to the main bag 11 to inflate the main bag 11.

Vent holes 27 are provided out of the portion of the sub bag gas path 26. The vent holes 27 have the same function of the vent holes 14 of the first invention.

According to this embodiment, the gas is introduced from the inflator 5 to inflate the sub bag 25 and into the main bag 11 through the gas communicating holes 20 to inflate the main bag 11 at a substantially same time. Therefore, the pressure in the sub bag 25 can be maintained higher than the pressure in the main bag 11. The sub bag 25 can prevent the occupant more reliably from colliding with the steering wheel.

Figure 7:
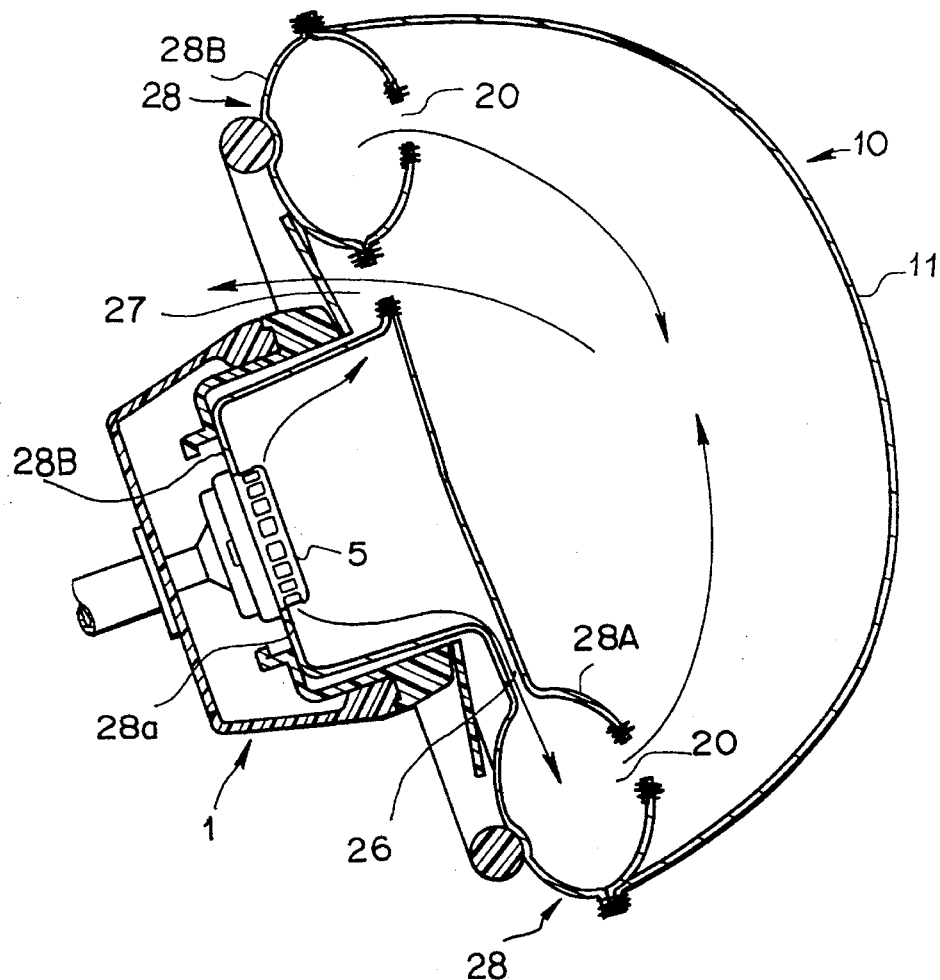
FIG. 7 is a sectional view showing another embodiment of the air bag according to the second invention.

FIG. 7 shows the other embodiment according to the second invention.

Figure 6:
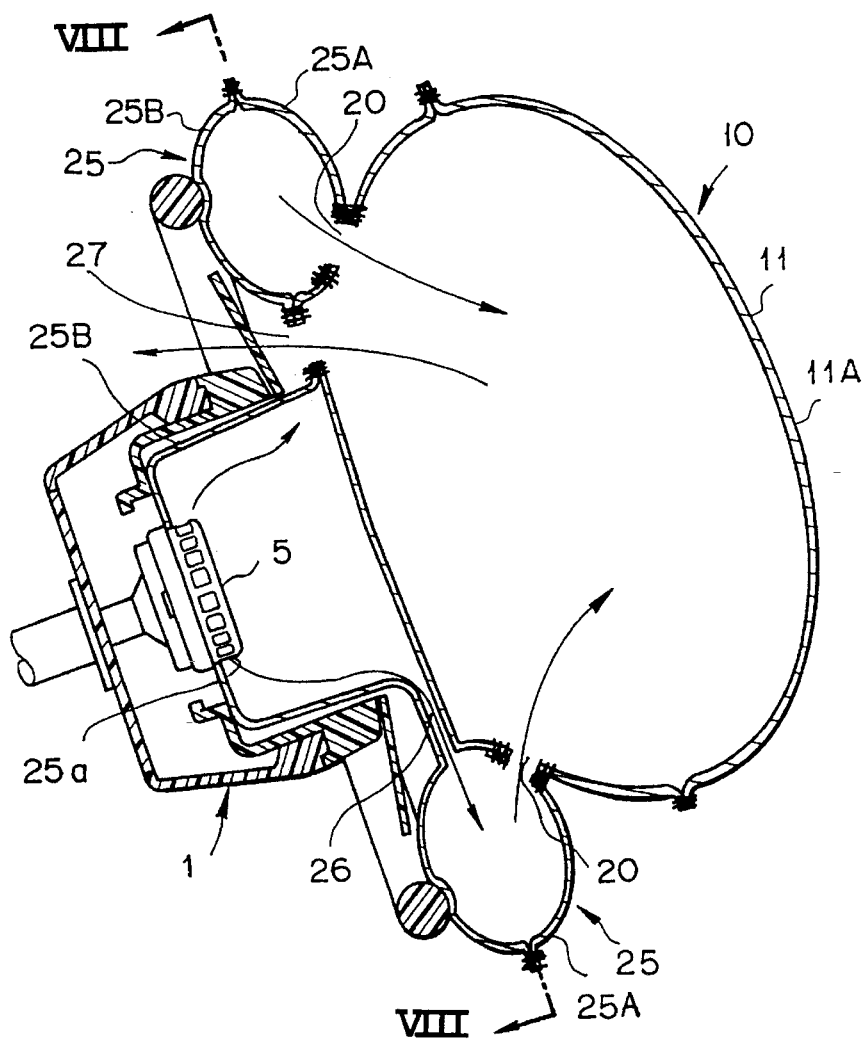
FIG. 6 is a sectional view showing an embodiment of an air bag device according to a second invention.

The whole structure of this embodiment is more simple by structuring the sub bag 25 shown in FIG. 6 smaller.

Though the gas inlet 25a is disposed on the sub bag 25 and connects the inflator 5 and the gas communicating holes 20 are provided in the surface of the main bag 11 through the sub bag 25 in FIG. 6, a base panel 28B of a sub bag 28 is accommodated in the main bag 11 and the gas communicating holes are independently provided in the surface of a ring panel 28A accommodated in the main bag 11 so that the gas communicating holes are not seamed with the textile of the main bag 11 as shown in FIG. 7 in this embodiment. A form of the sub bag gas path 26 and positions of the gas communicating holes 20 may be the same as shown in FIG. 8.

The structure as mentioned above can simplify a cutting form of the cloth for each bag and reduce the seaming portions thereby increase the productivity of the air bag.

The volume of the main bag is increased because the sub bag 28 is accommodated in the main bag 11 in this embodiment. The capacity of the gas generation of the inflator is preferable to be set suitably. It is a secondary effect that the receiving area of the main bag 11 is wider.

Figure 9:
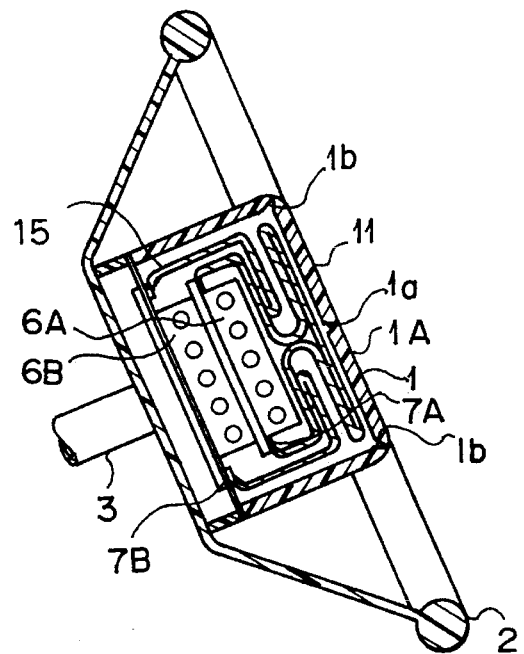
FIG. 9 is a sectional view showing an embodiment of an air bag device according to a third invention.
Figure 10:
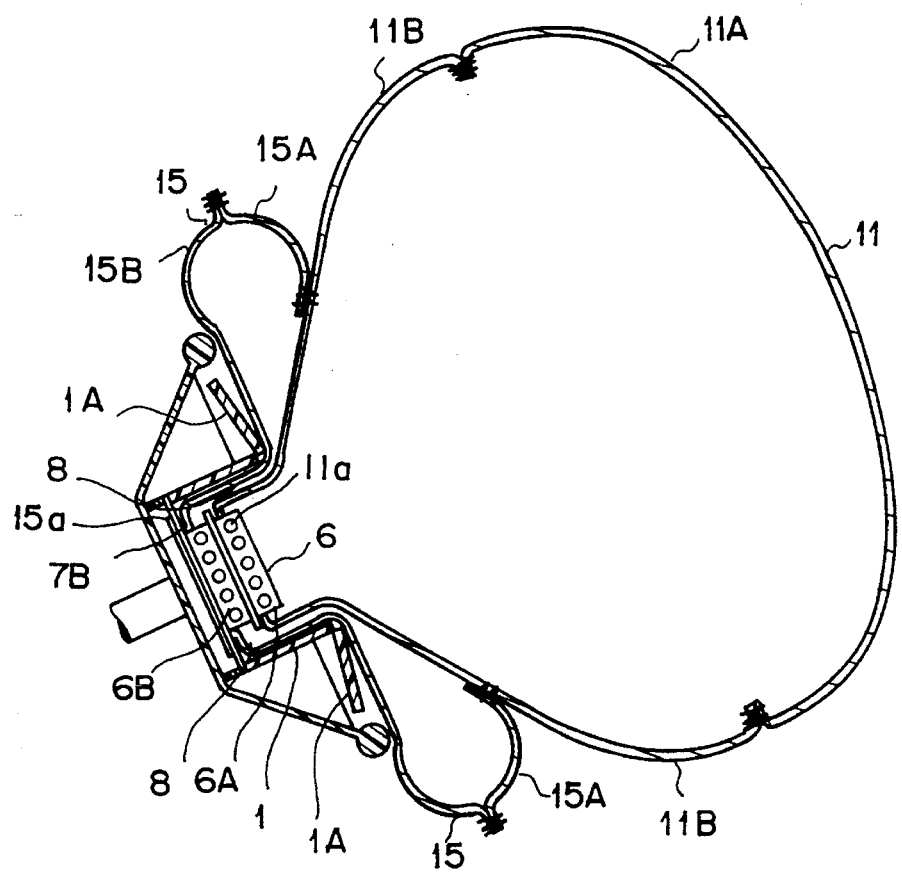
FIG. 10 is a sectional view showing an example of deployments of the air bag device as shown in FIG. 9.

Referring to FIG. 9 and FIG. 10, the description will now be made as regard to an air bag device as a third invention in which a main bag and a sub bag are inflated through different gas paths respectively by an inflator having two pairs of gas generating unit and gas outlets (the inflator will be called "dual inflator" hereinafter).

The outer form of the dual inflator 6 is a cylindrical shape arranged on an axial line of the steering column 3 similar to the conventional inflator. Gas outlets 6A for the main bag 11 and gas outlets 6B for the sub bag 15 are provided in the whole periphery of the dual inflator 6. The gas outlets 6A and the gas outlets 6B are separated in the upper side and the lower side, respectively. Fixing flanges 7A, 7B are disposed on the sides of the gas outlets 6A, 6B and are fixed to the gas inlets of the main bag 11 and the sub bag 15, respectively.

The inner structure of the dual inflator is now described briefly (See FIG. 9).

The dual inflator 6 has two pairs of a gas generating units accommodated therein. Each gas generating unit comprises an ignition mechanism and propellant generating nitrogen gas by reaction of azide or the like.

The ignition mechanism of each gas generating unit receives an ignition signal from an impact sensor (not shown) and ignites the propellant for inflating the main bag 11 and the propellant for inflating the sub bag 15 at the same time to generate reaction gas.

The pressure characteristic and the capacity of the generated gas of each gas generating unit are set corresponding to the volume of the air bag.

The volume of the main bag 11 is approximately 60 liters, while the volume of the sub bag 15 is approximately 30 liters in this embodiment. Therefore, the inflator for the sub bag generates gas less than the inflator for the main bag. The inflators are preferable to be set so that the gas pressure in the sub bag 15 is higher than the gas pressure in the main bag 11 after completion of the inflation.

If the volumes of the gas introduced into the main bag and the gas introduced into the sub bag and the gas pressures can be suitably set, the gas generating unit may be a small inflator for the sub bag and the conventional inflator for the main bag, besides an integral structure such as the above mentioned dual inflator.

Referring to FIG. 10, the description will now be made as regard to the form of the air bag portion having the main bag and the sub bag with the inflation condition.

The main bag 11 has the same form as the embodiment of the first invention as shown in FIG. 10. The gas inlet 11a is connected to the gas outlets 6A disposed at a distal end side of the dual inflator 6. The sub bag 15 is fixed so as to cover the periphery of the base panel 11B of the main bag.

The sub bag 15 deploying in a rough ring shape comprises a ring panel 15A and a base panel 15B. An end of the ring panel 15A is seamed with the base panel 11B of the main bag 11 along the periphery thereof. An end of the base panel 15B is received inside of the steering center pad 1 and fixed to the fixing flange 7B so as to cover the gas outlets 6B of the inflator 6.

When the gas is introduced into the sub bag 15, a ring shaped gas path 8 is formed around periphery of the root portion of the main bag 11. At this stage, the pressure of the gas introduced into the sub bag 15 is higher than the gas pressure in the main bag 11 so that the gas path 8 is kept in the ring shape during the gas introduction.

For keeping the gas path 8 of the sub bag 15, a ring member for keeping the shape is preferable to be disposed on the root portion of the main bag 11 to prevent the gas path 8 of the sub bag 15 from closing by excessive inflation of the main bag.

A plurality of gas paths may be spaced at a predetermined intervals and disposed radially instead of the gas path 8 disposed whole around the gas outlets.

In this embodiment, a first groove 1a (a tear line) is provided at the central portion of the inner surface of the steering center pad 1 accommodated in the dual inflator 6, further a second groove 1b (a bending line) is provided at a peripheral edge portion of the lid 1A. Thereby, the lid 1A of the pad facing the occupant can be bent completely outwardly.

Figure 11:
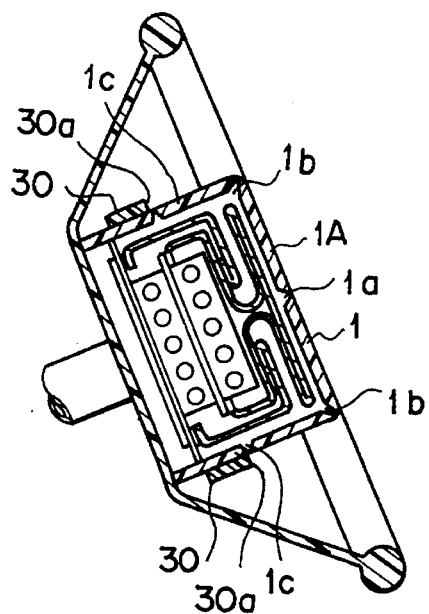
FIG. 11 is a sectional view showing another embodiment of the air bag device according to the third invention.
Figure 12:
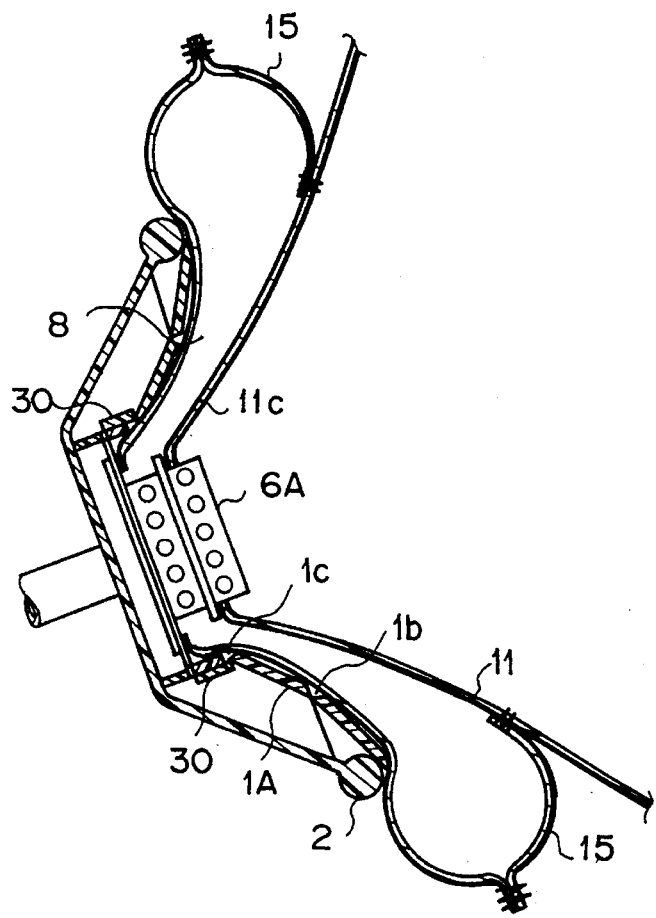
FIG. 12 is a partial sectional view showing an example of deployment condition of the air bag device as shown in FIG. 11.

FIG. 11 and FIG. 12 show another embodiment of the third invention in which the lid 1A of the steering center pad 1 can deploy over the wider area for securely keeping the gas path 8 of the sub bag 15.

In this embodiment, a stiffening ring member 30 is disposed at the root portion of the steering center pad 1. A third groove 1c (a bending line) is provided to the steering center pad 1 at a position of an end 30a of the stiffening ring member 30. Thereby, as an internal pressure is applied in the steering center pad 1, the lid 1A bends at the second groove 1b and at the third groove 1c so that the lid 1A deploys to be opened as far as the steering wheel 2. Thereby, the root portion 11c of the main bag 11 deploys to be opened from the gas outlet 6A of the inflator 6 and the sub bag 15 seamed with the main bag 11 opens around the main bag 11 so that the sectional area of the gas path 8 is enough to introduce gas into the sub bag 15.

As apparent from the above description, the air bag device according to each invention can prevent the occupant from colliding with the steering wheel as a reasonable cost and effectively protects the occupant as an essential function of the air bag.

What is claimed is:

1. An air bag device adapted to be attached to a center area of a steering wheel for protecting an occupant of a vehicle, comprising:

a steering pad attached to the center area of the steering wheel, an inflator situated in the steering pad, a first air bag retained in the steering pad and having a gas inlet attached to the inflator, said first air bag being inflated by the inflator upon collision of the vehicle to protect the occupant, a second air bag having an annular shape and fixed around the first air bag at a fixing portion, said second air bag, upon inflation of the first and second air bags, being located between the steering wheel and the first air bag, a plurality of gas communicating holes formed in the fixing portion for communication between the first and second air bags so that when the inflator is actuated, the second air bag is inflated by gas passing through the gas communicating holes while the first air bag is being inflated, and a vent hole formed in the first air bag, gas in the first air bag being exhausted through the vent hole while the gas in the second air bag is kept as it is when the occupant hits the first air bag after the first air bag is inflated so that force applied to the first air bag by the occupant is absorbed without a rebound phenomenon by the first air bag and without easing the rebound phenomenon by the second air bag.

2. An air bag device according to claim 1, wherein said second air bag is sewed to the first air bag by annular seams with a predetermined width therebetween, said seams forming the fixing portion.

3. An air bag device according to claim 2, wherein said gas communicating holes are formed between the two annular seams.

4. An air bag device adapted to be attached to a center area of a steering wheel for protecting an occupant of a vehicle, comprising:

a steering pad attached to the center area of the steering wheel, an inflator situated in the steering pad, a first air bag retained in the steering pad and being inflated by the inflator upon collision of the vehicle to protect the occupant, a second air bag fixed to the first air bag and having a gas inlet attached to the inflator, said second air bag, upon inflation of the first and second air bags, being located between the steering wheel and the first air bag, a plurality of gas communicating holes formed between the first and second air bags so that when the inflator is actuated, the first air bag is inflated by gas passing through the second air bag, and a vent hole formed in the first air bag, gas in the first air bag being exhausted through the vent hole while the gas in the second air bag is kept as it is when the occupant hits the first air bag after the first air bag is inflated so that force applied to the first air bag by the occupant is surely absorbed without a rebound phenomenon by the first air bag and without easing the rebound phenomenon by the second air bag.

5. An air bag device according to claim 4, wherein said second air bag is formed of an annular cloth with an outer periphery fixed to the first air bag, and includes an annular path to form an annular inflatable portion and crossing paths situated in a middle of the annular path and communicating with the gas inlet, said annular path and crossing paths communicating with each other.

6. An air bag device according to claim 5, wherein said vent hole is situated in an area surrounded by the annular path and the crossing paths.

7. An air bag device according to claim 6, wherein said annular inflatable portion is located inside the first air bag without protruding outwardly from the first air bag.

8. An air bag device adapted to be attached to a center area of a steering wheel for protecting an occupant of a vehicle, comprising:

a steering pad attached to the center area of the steering wheel, first and second inflators vertically arranged to each other and situated in the steering pad, a first air bag retained in the steering pad and having a first gas inlet attached to the first inflator, said first air bag being inflated upon collision of the vehicle to protect the occupant, and a second air bag fixed to an outside of the first air bag at an outer periphery thereof, said second air bag having a second gas inlet attached to the second inflator and, upon inflation of the second inflator, said second air bag being located between the steering wheel and the first air bag and inflated at a pressure greater than a pressure in the first air bag to thereby provide the pressure without easing the rebound phenomenon by the second air bag.

9. An air bag device according to claim 8, wherein said steering pad includes a tear line formed at a center area thereof, a first bending line formed at a peripheral portion of the center area, and a second bending line at a bottom portion thereof, said first and second bending lines establishing a gas path for the second air bag when it is inflated.

* * * * *